United States Patent
Haywood

(10) Patent No.: US 6,987,775 B1
(45) Date of Patent: Jan. 17, 2006

(54) VARIABLE SIZE FIRST IN FIRST OUT (FIFO) MEMORY WITH HEAD AND TAIL CACHING

(75) Inventor: Chris Haywood, Thousand Oaks, CA (US)

(73) Assignee: Internet Machines Corp., Agoura Hills, CA (US)

( * ) Notice: Subject to any disclaimer, the term of this patent is extended or adjusted under 35 U.S.C. 154(b) by 792 days.

(21) Appl. No.: 09/930,804

(22) Filed: Aug. 15, 2001

(51) Int. Cl.
*H04L 12/54* (2006.01)

(52) U.S. Cl. .......................... 370/429; 710/29

(58) Field of Classification Search ................ 370/229, 370/230, 235, 412, 428, 231, 468, 232, 413, 370/429; 709/232, 234, 235, 238; 710/29, 710/52, 60, 307, 310
See application file for complete search history.

(56) References Cited

U.S. PATENT DOCUMENTS

| | | | |
|---|---|---|---|
| 4,394,725 A | 7/1983 | Bienvenu et al. | |
| 4,704,606 A | 11/1987 | Hasley | |
| 4,754,451 A | 6/1988 | Eng et al. | |
| 5,550,823 A | 8/1996 | Irie | |
| 5,610,914 A | 3/1997 | Yamada | |
| 5,659,713 A | 8/1997 | Goodwin | |
| 5,845,145 A | 12/1998 | James | |
| 5,905,911 A | 5/1999 | Shimizu | |
| 5,961,626 A | 10/1999 | Harrison | |
| 5,982,749 A | 11/1999 | Daniel et al. | |
| 6,067,408 A * | 5/2000 | Runaldue et al. | 710/307 |
| 6,122,674 A | 9/2000 | Olnowich | |
| 6,172,927 B1 | 1/2001 | Taylor | |
| 6,292,878 B1 | 9/2001 | Morioka | |
| 6,389,489 B1 | 5/2002 | Stone | |
| 6,442,674 B1 * | 8/2002 | Lee et al. | 712/205 |
| 6,460,120 B1 | 10/2002 | Bass | |
| 6,487,171 B1 | 11/2002 | Honig | |
| 6,493,347 B2 | 12/2002 | Sindhu | |
| 6,510,138 B1 | 1/2003 | Pannell | |
| 6,557,053 B1 * | 4/2003 | Bass et al. | 710/29 |
| 6,570,876 B1 | 5/2003 | Aimoto | |
| 6,574,194 B1 * | 6/2003 | Sun et al. | 370/235 |
| 6,611,527 B1 | 8/2003 | Moriwaki | |
| 6,687,768 B2 | 2/2004 | Horikomi | |

(Continued)

OTHER PUBLICATIONS

PetaSwitch Solutions, Inc., The Pisces Chipset, Product Brief, 2001, http://www.peta-switch.com/products/product_brief.htm.

(Continued)

*Primary Examiner*—Man U. Phan
*Assistant Examiner*—Toan D. Nguyen
(74) *Attorney, Agent, or Firm*—SoCal IP Law LLP; Steven C. Sereboff; Mark Andrew Goldstein

(57) ABSTRACT

A variable size first in first out (FIFO) memory is provided. The variable size FIFO memory may include head and tail FIFO memories operating at a very high data rate and an off chip buffer memory. The off chip buffer memory may be, for example, of a dynamic RAM type. The off chip buffer memory may temporarily store data packets when both head and tail FIFO memories are full. Data blocks of each of the memories may be the same size for efficient transfer of data. After a sudden data burst which causes memory overflow ceases, the head and tail FIFO memories return to their initial functions with the head FIFO memory directly receiving high speed data and transmitting it to various switching element and the tail FIFO memory storing temporary overflows of data from the head FIFO memory.

10 Claims, 2 Drawing Sheets

U.S. PATENT DOCUMENTS

| | | |
|---|---|---|
| 6,708,262 B2 * | 3/2004 | Manning .................... 711/167 |
| 6,795,870 B1 | 9/2004 | Bass |
| 2002/0054602 A1 | 5/2002 | Takahashi |
| 2002/0099855 A1 | 7/2002 | Bass |
| 2002/0122386 A1 | 9/2002 | Calvignac |

OTHER PUBLICATIONS

PetaSwitch Solutions, Inc., PetaSwitch Solutions Announces Raising $4 Million in First Round Financing, Press Release, 2001, http://peta-switch.com/newsroom/press_releases.htm.

Gupta, Scheduling in Input Queued Switches: A Survey, Jun. 1996, Department of Computer Science, Stanford University, California.

Schoenen, et al., Distributed Cell Scheduling Algorithms for Virtual-Output-Queued Switches, Dec. 1999, pp. 1211-1215, vol. 1, GLOBECOM, IEEE Global Telecommunications Conference.

Fahmy, A Survey of ATM Switching Techniques, Aug. 14, 2001, Department of Computer and Information Science, The Ohio State University.

* cited by examiner

VARIABLE SIZE FIRST IN FIRST OUT (FIFO) MEMORY WITH HEAD AND TAIL CACHING

The present invention is structured to a variable size First In First Out (FIFO) memory with head and tail caching.

BACKGROUND OF THE INVENTION

Communications networks now require handling of data at very high serial data rates. For example, 10 gigabits per second (Gbps) is common. When it is required to process at these speeds, high speed data parallel connections are used to increase the effective bandwidth. This may be unsatisfactory because of the resultant decrease in bandwidth due to increased overhead requirements. There is a need for effective high speed switching apparatus and the associated hardware to support such a apparatus.

OBJECT AND SUMMARY OF INVENTION

It is therefore an object of the present invention to provide a variable size First In First Out (FIFO) memory.

In accordance with the above object, there is provided a variable size first in first out (FIFO) memory comprising a head FIFO memory for sequentially delivering data packets at a relatively slow rate to a plurality of switching elements whereby some latency occurs between data packets. A tail FIFO memory stores an overflow of the data packets from the head memory. Both the head and tail memories operate at a relatively high data rate equivalent to the data rate of incoming data packets. A large capacity buffer memory is provided having an effectively lower clock rate than the FIFO memories for temporarily storing data overflow from the tail memory whereby the FIFO memories in combination with the buffer memory form a variable size FIFO memory.

DETAILED DESCRIPTION OF PREFERRED EMBODIMENT

Figure 1:
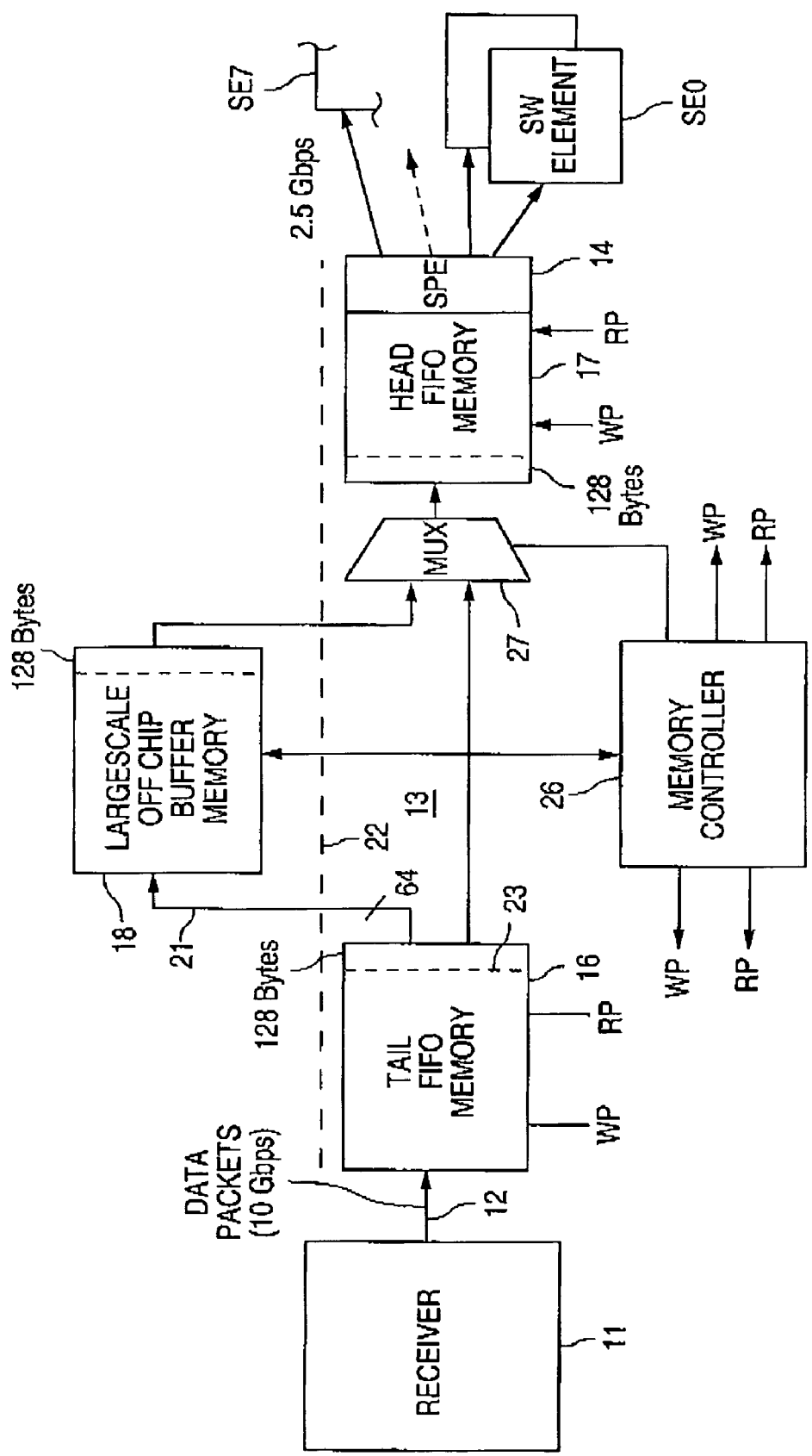
FIG. 1 is a block diagram of a memory embodying the present invention.

As disclosed in a co-pending application entitled High Speed Channels Using Multiple Parallel Lower Speed Channels having Ser. No. 09/962,056, switching of input data arriving at a relatively high data rate of, for example, 10 Gbps, may be accomplished. As illustrated in FIG. 1, a plurality of switching elements SE0–SE7 may operate at a lower data rate, for example 2.5 Gbps. By the use of a sequential or successive sprinkling technique for complete data packets, a high data rate may be maintained. Data packets arrive from a receiver 11 on line 12 at 10 Gbps and via the variable FIFO memory 13, FIFO being First In First Out memory. The receiver 11 may have a communications processor coupled to it. Data packets are routed to a sequential sprinkler engine (SPE) 14 and then distributed at the lower data rate to various switching elements SE0–SE7. In general, a variable FIFO memory is beneficial where a sudden burst of input data may occur which would temporarily overwhelm an individual FIFO memory without a large scale buffer memory 18 (which it can be assumed has almost unlimited memory capacity since it is remote or off the same semiconductor chip as the high speed memory).

Figure 2:
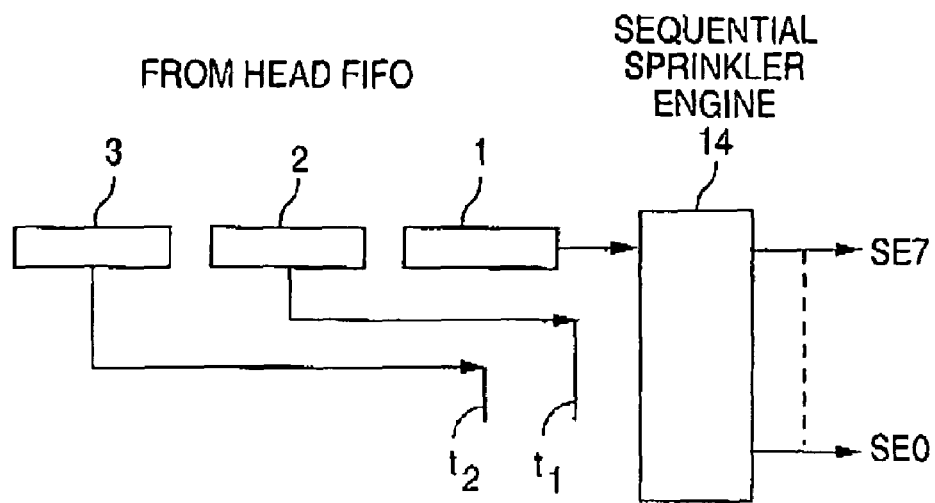
FIG. 2 is a diagrammatic portion of FIG. 1 illustrating its operation.

FIG. 2 illustrates where some latency may occur; in other words, thee would not be a continuous serial transmission of the high speed data packets through to the switch elements. Thus the data packets 1, 2, 3 are indicated in a line of data being received. The first data packet is routed to the switching element 7. After this operation is started, a short time later, as indicated by the time lapse $t_1$, data packet two is distributed by the sprinkler engine; and then data packet three at a later time $t_2$. Some latency occurs which must be compensated for by some type of buffer apparatus.

This is provided by the overall variable FIFO memory which is a combination of a tail FIFO memory 16, a head FIFO memory 17 and the large scale off chip buffer memory 18. Variable blocks of data are formed by a receiver 11 and transferred through the tail FIFO memory to the head FIFO memory 17 until it is filled. Thus, the tail or FIFO 16 routes data to the head FIFO memory 17 which then distributes data packets to the various switching elements. If the head FIFO memory becomes full, the tail FIFO memory will start filling. The tail FIFO will buffer enough data to keep the head FIFO filled. If the tail FIFO fills due to a sudden burst, data is then written on the line of 21 to the large scale off chip memory 18. This data will be read from the large scale memory into the head FIFO when the head FIFO starts to empty.

From a practical standpoint to operate at the data rate of 10 Gbps, tail FIFO 16 and head FIFO 17 are located on a common semiconductor substrate or chip with the large scale buffer memory 18 being remotely located off chip. This is indicated by the dash line 22. When the tail FIFO memory becomes full then the large scale off chip buffer memory 18 is utilized. Uniform blocks of data are stored indicated by the dash line 23. For example, 128 bytes is transferred on the line 21 into the memory 18. This memory also includes a similar block size of 128 bytes. For example, line 21 may have a 64 bit width (meaning eight bytes) and thus, the data block of 128 bytes is transferred in 16 clock cycles (16×64=128 bytes). Optimization of the bus width in all of the FIFO and buffer memories provide, in effect, a 100 percent efficient transfer technique since for every clock cycle a maximum number of bits is transferred. However buffer memory 18 has a lower clock rate and therefore wider bus. In the present application this could be two read and two write cycles. The various write pointers and read pointers (WP and RP) are so indicated on the various memories and the overall control is accomplished by the memory controller 26. A multiplexer 27 connected to memory controller 26 provides for control of the various data routings. When a sudden burst of data packets ceases, the FIFO memory can then return to its ordinary mode of operation where the head FIFO memory 17 contains all of the inputted data packets as delivered by the tail FIFO memory. Of course, this doesn't occur until the large scale off chip buffer memory 18 is unloaded.

Figure 3:
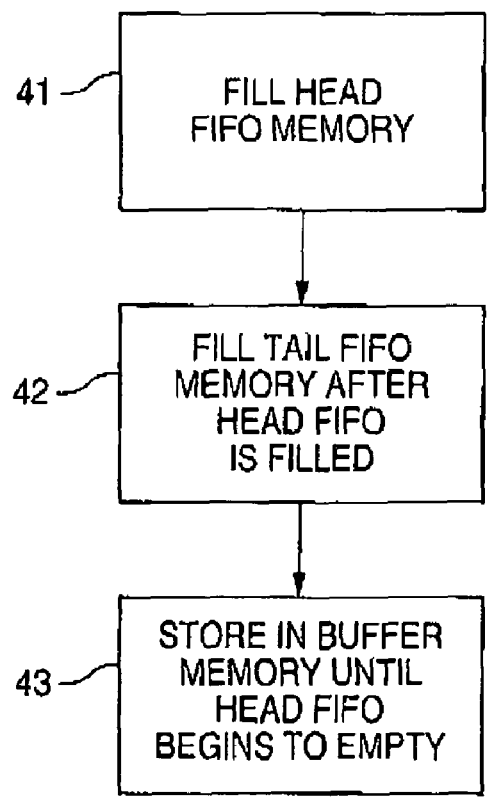
FIG. 3 is a flow chart of the operation of FIG. 1.

The foregoing operation is shown in a flow chart of FIG. 3. In step 41 the head FIFO memory is filled, and in step 42 if the head FIFO overflows, the tail FIFO memory is filled. Then in step 43 again when the tail FIFO is filled, data is stored in the buffer memory until the head FIFO begins to empty. In general, memory controller 26 monitors the FIFO depth and determines if a block of data needs to be stored to off chip memory. It also keeps track of how many blocks are written. As the FIFO memories empty, the memory controller is responsible for arbitrating and retrieving any stored blocks of data.

The larger external buffer memory 18 can be provisioned, using one of many allocation schemes, to support multiple head and tail FIFOs in the same manner as described.

Thus a variable FIFO memory with head and tail caching has been provided.

What is claimed is:

1. A variable size first in first out (FIFO) memory comprising:
   - a head FIFO memory including a sequential sprinkler engine for sequentially delivering data packets as delivered data packets to a plurality of switching elements at a slow rate relative to the head FIFO memory whereby some latency occurs between said delivered data packets, the switching elements operating at the slow rate;
   - a tail FIFO memory for storing an overflow of said data packets from said head FIFO memory and for receiving incoming data packets;
   - both said head FIFO memory and said tail FIFO memory operating at a relatively high data rate equivalent to a rate of the incoming data packets;
   - a large capacity buffer memory having an effectively lower clock rate than said head FIFO memory and said tail FIFO memory, the large capacity buffer memory for temporarily storing data overflow from said tail FIFO memory;
   - said head FIFO memory and said tail FIFO memory in combination with said buffer memory forming the variable size FIFO memory.

2. The variable size FIFO memory as in claim 1 wherein said head and tail FIFO memories each have data blocks of a predetermined and same size and wherein said large capacity buffer memory has the same size data block as said head and tail FIFO memories to achieve high efficiency data transfer between said head FIFO memory, said tail FIFO memory and said large capacity buffer memory.

3. The variable size FIFO memory as in claim 1 wherein said head and tail FIFO memories reside on a common semiconductor substrate, and wherein said large capacity buffer memory is remote to the common semiconductor substrate.

4. The variable size FIFO memory as in claim 1 wherein said large capacity buffer memory has a wider bus than a bus included in each of said head and tail FIFO memories.

5. The variable size FIFO memory as in claim 1 wherein said head and tail FIFO memories operate at approximately 10 Gbps and the switching elements operate at approximately 2.5 Gbps.

6. A method for implementing a variable size first in first out (FIFO) memory comprising:
   - receiving data packets in a tail FIFO memory
   - providing the data packets to a head FIFO memory
   - sequentially delivering the data packets as delivered data packets from a sprinkler engine included in the head FIFO memory to a plurality of switching elements, the sequentially delivering occurring at a slow rate relative to the head FIFO memory whereby some latency occurs between the delivered data packets;
   - temporarily storing in the tail FIFO memory a first overflow of the data packets when the head FIFO memory is full;
   - temporarily storing in a large capacity buffer memory having an effectively lower clock rate than said head FIFO memory and said tail FIFO memory a second overflow of said data packets when the tail FIFO memory is full, wherein both said head FIFO memory and said tail FIFO memory operate at a relatively high data rate equivalent to an incoming rate of the data packets.

7. The method for implementing the variable size FIFO memory as in claim 6 wherein said head and tail FIFO memories each have data blocks of a predetermined and same size and wherein said large capacity buffer memory has the same size data block as said head and tail FIFO.

8. The method for implementing the variable size FIFO memory as in claim 6 wherein said head and tail FIFO memories reside on a common semiconductor substrate, and wherein said large capacity buffer memory is remote to the semiconductor substrate.

9. The method for implementing the variable size FIFO memory as in claim 6 wherein said large capacity buffer memory has a wider bus than a bus included in each of the head FIFO memory and the tail FIFO memory.

10. The method for implementing the variable size FIFO memory as in claim 6 wherein said head and tail FIFO memories operate at approximately 10 Gbps and the switching elements operate at approximately 2.5 Gbps.

* * * * *